US012755223B2

(12) United States Patent
Helfrich et al.

(10) Patent No.: US 12,755,223 B2
(45) Date of Patent: Oct. 6, 2026

(54) ADJUSTING OPERATING PARAMETERS OF VEHICLES

(71) Applicant: Volvo Autonomous Solutions AB, Gothenburg (SE)

(72) Inventors: Thorsten Helfrich, Gothenburg (SE); Christoffer Markusson, Karlstad (SE); Peter Nilsson, Hovås (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 0 days.

(21) Appl. No.: 18/930,408

(22) Filed: Oct. 29, 2024

(65) Prior Publication Data

US 2025/0182012 A1 Jun. 5, 2025

(30) Foreign Application Priority Data

Dec. 1, 2023 (EP) .................................... 23213607

(51) Int. Cl.
*G06Q 10/0631* (2023.01)
*G05D 1/667* (2024.01)
(Continued)

(52) U.S. Cl.
CPC ....... *G06Q 10/06312* (2013.01); *G05D 1/667* (2024.01); *G05D 1/69* (2024.01);
(Continued)

(58) Field of Classification Search
CPC .. G06Q 10/06312; G06Q 10/08; G06Q 50/08; G05D 1/667; G05D 1/69;
(Continued)

(56) References Cited

U.S. PATENT DOCUMENTS 11,625,802 B1 * 4/2023 Konrardy ............... G08G 1/017 705/325
11,892,836 B2 * 2/2024 Whitfield, Jr. ....... G05D 1/0287
(Continued)

FOREIGN PATENT DOCUMENTS

EP 3761682 A1 1/2021
EP 3855273 A1 7/2021

OTHER PUBLICATIONS

Wang C, Zhao X, Fu R, Li Z. Research on the Comfort of Vehicle Passengers Considering the Vehicle Motion State and Passenger Physiological Characteristics: Improving the Passenger Comfort of Autonomous Vehicles. Int J Environ Res Public Health. Sep. 18, 2020;17(18). (Year: 2020).*
(Continued)

*Primary Examiner* — Amber A Misiaszek
(74) *Attorney, Agent, or Firm* — Jeffri A. Kaminski; Venable LLP

(57) ABSTRACT

A computer system having processing circuitry configured to handle two or more operating parameters associated with a set of vehicles operating in a work site is provided. The processing circuitry obtains a first indication indicative of an adjustment to be performed to the two or more operating parameters associated with the set of vehicles. The processing circuitry triggers the adjustment indicated by the first indication to be applied to the two or more operating parameters.

12 Claims, 4 Drawing Sheets

(51) Int. Cl.

| | |
|---|---|
| ***G05D 1/69*** | (2024.01) |
| ***G05D 105/20*** | (2024.01) |
| ***G05D 109/10*** | (2024.01) |
| ***G06Q 10/08*** | (2024.01) |

(52) U.S. Cl.
CPC ......... *G06Q 10/08* (2013.01); *G05D 2105/20* (2024.01); *G05D 2109/10* (2024.01)

(58) Field of Classification Search
CPC ........... G05D 2105/20; G05D 2109/10; G05D 1/651; G05D 2105/28; G05D 2107/90; G05D 1/223; G05D 1/646; G05D 1/693; G05D 1/6987

See application file for complete search history.

(56) References Cited

U.S. PATENT DOCUMENTS

| | | | | |
|---|---|---|---|---|
| 2005/0125117 A1* | 6/2005 | Breed | .................. | G07C 5/0808 701/31.5 |
| 2014/0163779 A1* | 6/2014 | Braunstein | ............ | E02F 9/2054 701/25 |
| 2016/0059854 A1* | 3/2016 | Ohsugi | ............... | B60W 30/095 701/50 |
| 2020/0181879 A1* | 6/2020 | Halder | .................. | E02F 9/2054 |
| 2022/0287218 A1* | 9/2022 | Yuasa | .................... | G05D 1/648 |
| 2023/0175232 A1* | 6/2023 | Verho | ................... | E02F 9/2029 172/2 |

OTHER PUBLICATIONS

Extended European Search Report in corresponding European Application No. 23213607.7 dated May 3, 2024 (7 pages).

* cited by examiner

ADJUSTING OPERATING PARAMETERS OF VEHICLES

TECHNICAL FIELD

The disclosure relates generally to vehicle management. In particular aspects, the disclosure relates to adjusting operating parameters associated with a set of vehicles operating in a work site. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

When multiple vehicles are controlled in a work site where autonomous vehicles operate, operational disturbances may arise, e.g., traffic jams, vehicle failures, bottlenecks for performing one or more specific operations where vehicles will have to wait for their turn, manual interference, and/or due to other unexpected events. These disturbances cause the work site to have a disrupted workflow which further means poor productivity e.g., due to congested areas or that some areas and/or operations may not be possible to perform efficiently.

Likewise, a problem may also occur if the vehicles perform too few operations per set time unit, even though there is no congestion or disturbances.

A way of handling the issues discussed above is to shut down an entire or partial work site, and/or to adjust the number of vehicles. However, these solutions are not always possible and are very inefficient in terms of cost and productivity.

Hence, there is a need to better handle workflows for autonomous vehicles in a work site.

SUMMARY

According to a first aspect of the disclosure, a computer system comprising processing circuitry configured to handle two or more operating parameters associated with a set of vehicles operating in a work site is provided. The processing circuitry is configured to obtain a first indication indicative of an adjustment to be performed to the two or more operating parameters associated with the set of vehicles. The processing circuitry is configured to trigger the adjustment indicated by the first indication to be applied to the two or more operating parameters.

The first aspect of the disclosure may seek to improve work flows for vehicles in the work site, in particular to resolve any operational disturbances in the work site.

A technical benefit may include improved workflow management at the work site. This is since the workflow at the work site may be efficiently adjusted to handle any disturbances, e.g., to a congested or non-congested workflow, such as the workflow may be sped up when deemed possible or that congestions may be resolved to transition to a non-congested workflow.

This is since the adjustment can be performed to the two or more operating parameters, thereby the adjustment can efficiently be performed to control the entire workflow by controlling multiple operating parameters simultaneously, which both are adjusted to control the workflow. For example, the two or more operating parameters needed to be adjusted may relate to a speed used when driving around corners, and a tipping speed for unloading materials. The adjustment may then be to reduce these in a uniform manner, e.g., by 10% respectively. The workflow may then continue at a partially slower pace, but may resolve congestion in the work site and thereby improve the workflow. The two or more operations may be any identified operating parameters identified to, in combination, affect a workflow of the work site. When congestion is low, it is also possible that the two or more operating parameters can be adjusted to speed up operations in the work site, e.g., to reduce needed distance between vehicles by 5% and at the same time allow a 5% increase in acceleration. Furthermore, the two or more operating parameters may be selected such as to target any critical aspect of the workflow of the set of vehicles in the work site.

In other words, the first aspect allows for a flexible and efficient approach for handling the workflow of the set of vehicles and the work site by triggering the adjustment indicated by the first indication to the two or more operating parameters.

Optionally in some examples, including in at least one preferred example, the two or more operating parameters respectively controls and/or constrains one, two, or more operations to be performed by the set of vehicles.

A technical benefit may include a more efficient workflow management of the work site due to directly affecting the one or more operations to be performed by the set of vehicles, e.g., unloading or loading.

Optionally in some examples, including in at least one preferred example, the processing circuitry is configured to trigger the adjustment by being configured to any one or both out of Example options 1) and 2) below:

Example option 1) transmit to the set of vehicles, an indication of the adjustment and an indication of the two or more operating parameters. In this example option, each vehicle out of the set of vehicles are respectively triggered to locally adjust the two or more operating parameters based on the adjustment for the respective vehicle.

Example option 2) transmit to a central planning unit, an indication of the adjustment and an indication of the two or more operating parameters. In this example option, the central planning unit is triggered to control one or more operations to be performed by the set of vehicles based on the indicated adjustment and the indicated two or more operating parameters.

A technical benefit may include a more efficient workflow management of the work site. This is since the adjustment to the two or more operating parameters can be performed centrally, distributed to the set of vehicles, or a combination thereof.

Optionally in some examples, including in at least one preferred example, the set of vehicles comprises all vehicles operating in the work site, or a sub-set of vehicles operating in the work site.

A technical benefit may include a more efficient workflow management of the work site. This is since the adjustment may target specific vehicles or all vehicles.

Optionally in some examples, including in at least one preferred example, the processing circuitry is further configured to obtain a third indication indicative of respective identities of the set of vehicles.

A technical benefit may include a more efficient workflow management of the work site. This is since the vehicles targeted by the adjustment may be dynamically indicated by the third indication.

Optionally in some examples, including in at least one preferred example, the two or more operating parameters comprise any one or more out of:

one, two, or more transport related parameters of the set of vehicles, a work related parameter of the set of vehicles, a maintenance related activity of the set of vehicles, an acceleration of the set of vehicles, a turning speed of the set of vehicles, a speed when driving in straight section of the set of vehicles, a movement speed of equipment of the set of vehicles, a tipping speed of equipment of the set of vehicles, a maximum and/or minimum load of the set of vehicles, one or more brake configurations of the set of vehicles, one or more parameters of a speed profile of the set of vehicles, one or more speed profiles of the set of vehicles, one or more queuing configurations of the set of vehicles, one or more waiting times for one or more vehicle conditions of the set of vehicles, one or more waiting times for one or more locations of the set of vehicles, a longitudinal following distance of the set of vehicles one or more situational crossing distances of the set of vehicles, preferably comprising an intersection crossing distance, and one or more enumerated locations.

A technical benefit may include a more efficient workflow management of the work site. This is since the two or more operating parameters may target any suitable two or more parameters for improving the workflow of the work site. The two or more operating parameters may preferably be associated with the same area and/or operation such that the adjustment has a direct correlation to affecting the workflow accordingly.

Optionally in some examples, including in at least one preferred example, the two or more operating parameters comprises at least one category parameter and/or forms at least one category of parameters. In this example, the at least one category parameter and/or the at least one category of parameters is/are mapped to one or more sub-parameters based on a mapping. In this example, the processing circuitry is further configured to obtain said mapping between the at least one category parameter and/or the at least one category of parameters, and the one or more sub-parameters. In this example, the processing circuitry is further configured to trigger the adjustment indicated by the first indication to be applied to the two or more operating parameters by being configured to trigger the adjustment to be applied to the one or more sub-parameters.

A technical benefit may include a more efficient workflow management of the work site. This is since sub-parameters may be automatically adjusted when targeting and/or adjusting a category parameter or category of parameters.

Optionally in some examples, including in at least one preferred example, the at least one category parameter and/or the at least one category of parameters respectively comprises any one or more out of:

speed of the set of vehicles, waiting time of the set of vehicles, distance to other vehicles for the set of vehicles, location of one or more operations to be performed by the set of vehicles.

In this example, the corresponding respective one or more sub-parameters of the at least one category parameter and/or at least one category of parameters comprise any one or more out of:

for speed of the set of vehicles, any one or more out of: an acceleration, a turning speed, a speed when driving in straight section, a movement speed of equipment of the set of vehicle, a maximum and/or minimum loading weight of the set of vehicles, a speed profile of the set of vehicles, a brake configuration of the set of vehicles, and a tipping speed of equipment of the set of vehicles;

for waiting time of the set of vehicles, any one or more out of: one or more waiting times for one or more vehicle conditions, a queuing configuration, and one or more waiting times for one or more locations, for distance to other vehicles, any one or more out of: a default longitudinal following distance, a queueing configuration, and one or more situational crossing distances, preferably an intersection crossing distance, for location of operations to be performed by the set of vehicles, one or more enumerated locations.

A technical benefit may include a more efficient workflow management of the work site. This is since the sub-parameters may efficiently be adjusted with respect to the corresponding at least one category parameter and/or the at least one category of parameters.

Optionally in some examples, including in at least one preferred example, the adjustment is represented as a relative adjustment to the two or more operating parameters.

A technical benefit may include a more efficient workflow management of the work site. This is since the two or more operating parameters can be adapted in a flexible and efficient manner by just one single relative operation, e.g., increase by X1%, add, multiply or perform other arithmetic operation with X2 to the respective parameter, etc. It follows that this enables the workflow of the work site to be adjusted by just a relative operation, which simplifies workflow management and can serve to reduce congestion and/or to increase productivity.

Optionally in some examples, including in at least one preferred example, the processing circuitry is configured to obtain a second indication indicative of the two or more operating parameters associated with the set of vehicles 11.

A technical benefit may include a more efficient workflow management of the work site. This is since the two or more operating parameters may be dynamically determined to affect any suitable part of the workflow of the work site, e.g., at least partly selected by a user and/or automatically determined based on a detected disturbance in the work site.

Optionally in some examples, including in at least one preferred example, the processing circuitry is configured to obtain the first indication as input from a user interface.

Optionally in some examples, including in at least one preferred example, the processing circuitry is configured to obtain the second indication as input from a user interface.

A technical benefit of any or both of the above two examples may include a more efficient workflow management of the work site. This is since the adjustment and/or selection of the two or more operating parameters may be performed by a simple user interface. For example, the operations may be predefined or selected individually and/or by category. The adjustment may then be performed by means of a slider or knob, performing a corresponding relative adjustment to all selected operating parameters.

Optionally in some examples, including in at least one preferred example, the processing circuitry is configured to obtain the second indication of the two or more operating parameters by being configured to obtain an indication of a first operating parameter, and based on the first operating parameter, identify at least one secondary operating parameter.

A technical benefit may include a more efficient workflow management of the work site. This is since there may be no need to input the at least one secondary operating parameter, as it can be identified based on the first operating parameter, e.g., which may be a main parameter such as a category parameter or a general parameter most important to a work flow, and the at least one secondary operating parameters may comprise associated parameters.

Optionally in some examples, including in at least one preferred example, the first operational parameter and the at least one secondary parameter is associated with at least one common operation of the set of vehicles.

A technical benefit may include a more efficient workflow management of the work site. This is since the operations all affect the common operation, e.g., unloading or loading of the set of vehicles, which directly is associated with the work flow.

Optionally in some examples, including in at least one preferred example, the at least one secondary parameter is in a same category as the first operating parameter, or is a sub-parameter of the first operating parameter.

A technical benefit may include a more efficient workflow management of the work site. This is since the operations all affect the same category, e.g., such as speed parameters, or transporting parameters, or maintenance parameters.

Optionally in some examples, including in at least one preferred example, the first operating parameter is a parameter controlling a travel motion of the set of vehicles, and wherein the processing circuitry is configured to identify the at least one secondary operating parameter as comprising at least one second parameter controlling a load handling parameter of the set of vehicles.

A technical benefit may include a more efficient workflow management of the work site. This is since the adjustment will affect both a travel and load aspect of the workflow of the work site, e.g., speed limit and maximum payload to load the set of vehicles 11 with.

According to a second aspect of the disclosure, a first vehicle comprising the computer system according to the first aspect is provided.

The technical benefits correspond to the technical benefits of the first aspect.

Optionally in some examples, including in at least one preferred example, the first vehicle is at least partly autonomous. In this example, the first vehicle is part of a set of vehicles. In this example, each vehicle in the set of vehicles is controlled and/or constrained by the two or more operating parameters according to the first aspect.

A technical benefit may include a more efficient workflow management of the work site due to improved control of at least partly autonomous vehicles.

According to a third aspect of the disclosure, a computer-implemented method for handling two or more operating parameters associated with a set of vehicles operating in a work site is provided. The method comprises, by processing circuitry of a computer system, obtaining a first indication indicative of an adjustment to be performed to the two or more operating parameters associated with the set of vehicles. The method comprises, by the processing circuitry, triggering the adjustment indicated by the first indication to be applied to the two or more operating parameters.

The technical benefits of the third aspect correspond to the technical benefits of the first aspect.

Optionally in some examples, including in at least one preferred example, the two or more operating parameters respectively controls and/or constrains one or more operations to be performed by the set of vehicles.

Optionally in some examples, including in at least one preferred example, triggering the adjustment comprises any one or both out of:

transmitting to the set of vehicles, an indication of the adjustment and an indication of the two or more operating parameters, wherein each vehicle out of the set of vehicles are respectively triggered to locally adjust the two or more operating parameters based on the adjustment for the respective vehicle, transmitting to a central planning unit, an indication of the adjustment and an indication of the two or more operating parameters, wherein the central planning unit is triggered to control one or more operations to be performed by the set of vehicles based on the indicated adjustment and the indicated two or more operating parameters.

Optionally in some examples, including in at least one preferred example, the two or more operating parameters comprises at least one category parameter and/or forms at least one category of parameters, which at least one category parameter and/or at least one category of parameters is/are mapped to one or more sub-parameters based on a mapping. In this example the method further comprises, by the processing circuitry, obtaining the mapping between the at least one category parameter and/or at least one category of parameters and the one or more sub-parameters. In this example, triggering the adjustment indicated by the first indication to be applied to the two or more operating parameters comprises triggering the adjustment to be applied to the one or more sub-parameters.

Optionally in some examples, including in at least one preferred example, the computer-implemented further comprises, by the processing circuitry, obtaining a second indication indicative of the two or more operating parameters associated with the set of vehicles, and optionally, wherein obtaining the second indication of the two or more operating parameters comprises:

obtaining an indication of a first operating parameter, and based on the first operating parameter, identifying at least one secondary operating parameter.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
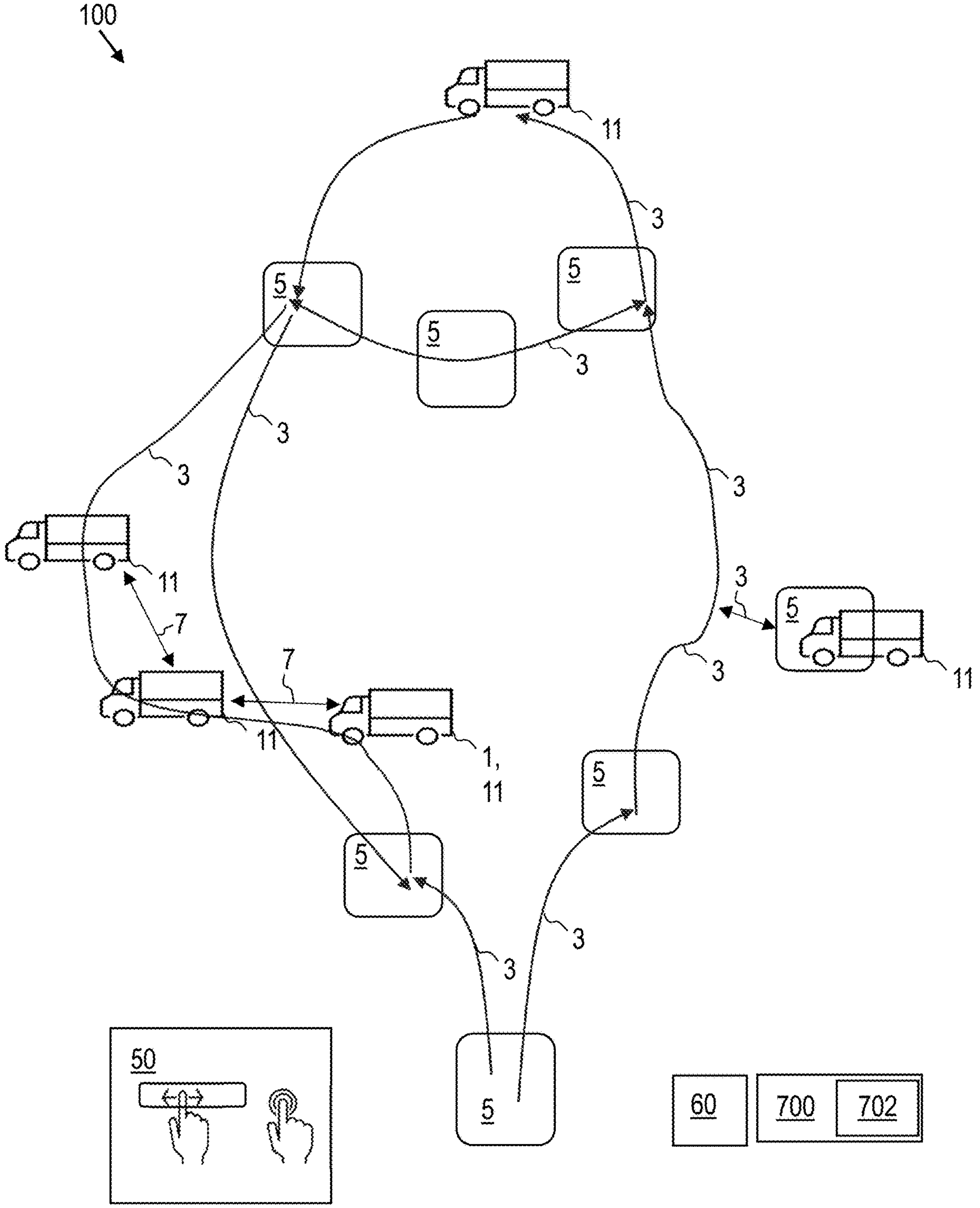
FIG. 1 is an exemplary work site according to an example.

FIG. 1 illustrates a work site 100 according to some examples herein.

The work site may comprise one or more locations 5, e.g., one or more areas where operations such as unloading or loading operations may take place.

The one or more locations may be connected by one or more paths 3.

In the work site 100, a set of vehicles 11 operates. The set of vehicles 11 may comprise a first vehicle 1. The first vehicle 1 may be at least partly autonomous.

The set of vehicles may typically be driverless and/or may not have any user therein. However, in some examples, users may be present in the set of vehicles 11, e.g., in the first vehicle 1.

The work site 100 may typically only comprise the set of vehicles 11, however, other vehicles and/or personnel may also operate therein e.g., in designated shared areas.

The set of vehicles 11 may be arranged to perform one or more operations in the work site 100, e.g., to travel between the one or more locations 5 using the one or more paths 3.

The set of vehicles 11 may comprise one, two, three, or more autonomous vehicles. Autonomous vehicles as used herein may represent any suitable vehicle which may at least partly perform one or more operations without explicit user control and/or may be controlled by a central planning unit 60. For example, an autonomous vehicle in the set of vehicles 11 may be configured e.g., preconfigured or by the central planning unit 60, to perform loading and unloading operations at one or more different locations 5 and may be configured to select one or more paths 3 to travel between these different locations.

In some examples, the central planning unit 60 may be configured to control one or more operations of the set of vehicles 11, e.g., their speed, their respective operations, routing, number of vehicles in the set of vehicles 11, etc.

The set of vehicles 11 may comprise one or more types of vehicles, e.g., one or more trucks, excavators, heavy duty vehicles, loaders, dump trucks, buses, and/or any suitable transporting vehicle.

The set of vehicles 11 may typically comprise a plurality of vehicles, e.g., two, three or more vehicles.

The work site 100 may be dimensioned for the number of vehicles in the set of vehicle 1, e.g., such that slight disturbances or problems in the work site 100, may result in congestion.

The set of vehicles 11 may be configured to perform a number of operations in the work site 100, e.g., loading, unloading, travelling, transporting, etc., e.g., according to a defined schedule.

To perform operations, the set of vehicles 11 may be configured with operating parameters, individually or collectively, e.g., indicating respective speed, acceleration, tipping speed, locations, etc.

To adjust these operating parameters, examples herein discuss how it is possible to obtain an indication of an adjustment and to trigger said adjustment to be performed to the two or more operating parameters, which improves workflow management of the work site 100.

The two or more operating parameters may be predefined or dynamically selected. Selecting or obtaining a first parameter may automatically and/or implicitly determine a second parameter. I.e., the two or more operating parameters may be linked by configuration or dynamic selection, and the adjustment is applicable for all of the two or more operating parameters, in the same or corresponding manner.

In some examples, each vehicle in the set of vehicles 11, e.g., the first vehicle 1, is/are controlled and/or constrained by the two or more operating parameter, as will be further discussed in examples herein.

The two or more operating parameters of examples herein may relate to a wide range of operating parameters which may adjust a workflow of the work site 100, e.g., a speed, a tipping speed of an equipment or trailer, or a following distance 7, e.g., defining a minimum or preferred distance to another vehicle, e.g., during certain specific traffic situations or depending on the location 5.

The indications of examples herein, e.g., of the two or more operating parameters, which vehicles defined the set of vehicles 11, and/or which adjustment to perform, may be obtained, e.g., as input, using a user interface 50. For example, the user interface 50 may comprise a knob, stalk, slider or button(s), which may be used to obtain the adjustment, e.g., when sliding the slider a relative adjustment may be obtained, e.g., increase, shift, and/or multiply by X, where X is determined by the slider in this example.

For flexibility and for ease of use, the user interface 50 may comprise a Human Machine Interface (HMI). The HMI may be a physical and/or virtual HMI, e.g. a knob or slider, linked to the two or more operating parameters, and/or be able to determine the two or more operating parameters.

The user interface 50 may comprise a clear disabling functionality, e.g., a button, to reset all affected parameters back to default.

The user interface 50 may comprise a functionality enabling to select the two or more operating parameters to be affected by an adjustment, and/or to select parameters not to be selected by an adjustment.

In some examples, a category of parameters may be selected in the user interface 50, which causes an adjustment to affect all associated parameters, in some of these examples, the two or more operating parameters may be selected such that some parameters are explicitly set to not be affected by an adjustment even if they belong to said category of parameters.

Examples herein may be performed by a computer system 700 and/or by a processing circuitry 702 therein.

The computer system 700 and/or the processing circuitry 702 therein may be a processor and/or an Electronic Control Unit (ECU).

The computer system 700 and/or the processing circuitry 702 therein may be one or more remote units e.g., as part of a cloud service in a server, and/or comprised in the first vehicle 1 and/or as part of the central planning unit 60.

The computer system 700 and/or the processing circuitry 702 therein may be communicatively coupled with, and/or able to control, any suitable unit and/or entity of the vehicle 1.

Figure 2:
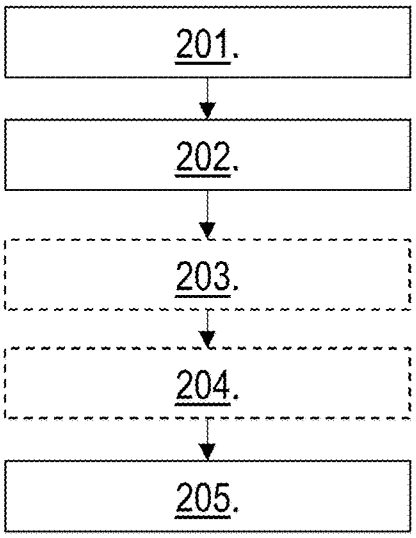
FIG. 2 is an exemplary flowchart of a method according to an example.

FIG. 2 is an exemplary flowchart of a method for handling two or more operating parameters associated with the set of vehicles 11 operating in the work site 100 according to an example. In some of these examples, the set of vehicles 11 comprises all vehicles operating in the work site 100, or a sub-set of vehicles 11 operating in the work site 100.

The method comprises the following actions which may be taken in any suitable order. Dashed boxes in FIG. 2 indicates optional actions. Examples herein may be performed by the computer system 700, and in particular the processing circuitry 702.

Action 201

The method comprises obtaining a first indication indicative of an adjustment to be performed to the two or more operating parameters associated with the set of vehicles 11.

The adjustment may indicate a value which may be used to arithmetically adjust the two or more operating parameters.

The first indication may be obtained as input from the user interface 50.

In some examples, the adjustment is represented as a relative adjustment to the two or more operating parameters.

The relative adjustment may be to increase or decrease a respective parameter with an adjustment factor, e.g., by an arithmetic operation which can be defined by the adjustment itself and/or by being predefined based on the parameter, e.g., a multiplication coefficient or an addition based on a value indicated by the adjustment.

For example, the relative adjustment may be to multiply a parameter with X, e.g., to increase or decrease by a set percentage. Additionally, some parameters may be enumerated such that the arithmetic operations can cause a shift in the enumerations, e.g., if using a location Z for unloading, an adjustment may be to use the location Z+X, e.g., with respect to a modulo operation or similar wrap-around arithmetic functionalities.

In other words, all two or more operating parameters may be adjustable based on the adjustment, typically each of the two or more operating parameters is a value and the adjustment is also a value, and the adjustment is made using a predefined arithmetic operation, or an arithmetic operation defined by the adjustment and/or the respective parameter.

The adjustment may be indicative to be applicable to all of the two or more operating parameters, or just to a sub-set therein, e.g., for a certain type of parameters.

In some examples, the two or more operating parameters may respectively control and/or constrain one or more operations to be performed by the set of vehicles 11. For example, the one or more operations may be loading, unloading, transportation of goods or people, maintenance activities, e.g., in certain designated locations 5. Accordingly, the corresponding two or more operating parameters may all/both be parameters relating to these operations and/or locations.

As an example, the two or more operating parameters may comprise any one or more out of:

- one, two, or more transport related parameters of the set of vehicles 11, e.g., relating to a speed, a braking steering, a gear shift, or potentially a payload parameter such as a limit to the payload,
- a work related parameter of the set of vehicles 11, e.g., loading or unloading such as with different parameters for loading and unloading, e.g., tipping or dumping speed, loading equipment selection, loading location 5, unloading location 5, speed when loading using a silo,
- a maintenance related activity of the set of vehicles 11, e.g., charging and/or refueling parameters, and/or sensor calibration parameters such as how, where and, when to calibrate sensors,
- an acceleration of the set of vehicles 11,
- a turning speed of the set of vehicles 11,
- a movement speed of equipment of the set of vehicles 11,
- a tipping speed of equipment of the set of vehicles 11,
- a maximum and/or minimum load of the set of vehicles 11,
- one or more brake configurations of the set of vehicles 11,
- one or more parameters of a speed profile of the set of vehicles 11,
- one or more speed profiles of the set of vehicles 11,
- one or more queuing configurations of the set of vehicles 11,
- one or more waiting times for one or more vehicle conditions of the set of vehicles 11,
- one or more waiting times for one or more locations 5 of the set of vehicles 11,
- a longitudinal following distance 7 of the set of vehicles 11
- one or more situational crossing distances of the set of vehicles 11, preferably comprising an intersection crossing distance, and
- one or more enumerated locations, e.g., the adjustment may shift the locations using an arithmetic operation also suitable for use when adjusting another parameter e.g., a current or maximum allowed speed of the set of vehicles 11.

In some examples, the two or more operating parameters comprises at least one category parameter and/or at least one category of parameters. The category parameter and/or at least one category of parameters is/are mapped to one or more sub-parameters based on a mapping, the mapping may be predefined e.g., based on different operation and/or based on operational relationships between the different parameters, e.g., all speed related parameters may form one category, or a category parameter may be speed, which may affect a predefined or set number of speed parameters, e.g., tipping speed of an equipment of a vehicle, as well as longitudinal speed on a straight trajectory or path 3.

In other words, the two or more operating parameters may comprise one category parameter and one sub-parameter.

In some examples, the at least one category parameter and/or the at least one category of parameters respectively comprises any one or more out of:

- speed of the set of vehicles 11,
- maintenance of the set of vehicles 11,
- transportation related activities,
- a work related operation,
- waiting time of the set of vehicles 11,
- distance to other vehicles for the set of vehicles 11, and
- location of one or more operations to be performed by the set of vehicles 11.

In some of these examples, the corresponding respective one or more sub-parameters of the at least one category parameter and/or at least one category of parameters may comprise any one or more out of:

- for speed of the set of vehicles 11, any one or more out of: an acceleration, a turning speed, a speed when driving in straight section, a movement speed of equipment of the set of vehicles 11, a maximum and/or minimum loading weight of the set of vehicles 11, a speed profile of the set of vehicles 11, a brake configuration of the set of vehicles 11, and a tipping speed of equipment of the set of vehicles 11;
- for waiting time of the set of vehicles 11, any one or more out of: one or more waiting times for one or more vehicle conditions, a queuing configuration, and one or more waiting times for one or more locations 5;

for distance to other vehicles, any one or more out of: a default longitudinal following distance 7, a queueing configuration, and one or more situational crossing distances, preferably an intersection crossing distance;

for maintenance of the set of vehicles 11: a charging/refueling parameter e.g., method, location and/or fuel to use for charging or refueling, and/or a sensor calibration parameter such as a method, time, and/or location to perform calibration of sensors, for a work related operation: an unloading parameter such as e.g., tipping or dumping speed, and/or unloading location; and/or a loading parameter such as a loading equipment selection, loading location 5, and/or a speed when loading using a specific method or equipment, e.g., using a silo;

for transport related activities: one, two, or more transport related parameters of the set of vehicles 11, e.g., relating to a speed, a braking steering, a gear shift, or potentially a payload parameter such as a limit to the payload; and for location of operations to be performed by the set of vehicles 11, one or more enumerated locations.

In other words, the two or more operating parameters may comprise any suitable set of parameters, either directly, or indirectly by use of category parameters or categories, as long as they are at least two in number and may be adjusted in the same or corresponding manner using the adjustment.

If adjusting the two or more operating parameters would affect a safety condition of an area or operation, e.g., entering a closed-off area may be defined to be only safe if speed is reduced to 75% or slower, a current global safety level may be indicated as part of the user interface 50, e.g., displayed on a display.

One or more safety conditions may be predefined with respect to the two or more operating parameters.

The two or more operating parameters may affect all vehicles in the set of vehicles 11, and/or the entire work site 100. Alternatively, the two or more operating parameters may be used partially, e.g., for affecting vehicles going in/out or operating in a set location 5 of the work site 100 and/or affecting specific vehicles by their vehicle type, e.g., only dumpers, only excavators, only trucks etc.

In other words, the two or more operating parameters may be associated with any of: a set location 5, a set operation, a set vehicle type, or a combination thereof. This allows an efficient manner of controlling the workflow of the work site 100 as a particular aspect can be controlled with ease and in an accurate manner.

The two or more operating parameters may be obtained automatically or by user selection e.g., as further discussed in action 202. Automatically determined may comprises e.g., obtaining sensor data and/or status information of the set of vehicles 11 and/or the work site 100, and using said sensor data and/or status information to determine the two or more operating parameters, e.g., based on a static mapping and/or based on detecting a disturbance in the work site 100, and mapping the determined disturbance to the two or more operating parameters.

Action 202

In some examples, e.g., where the two or more operating parameters are not predefined or otherwise automatically determined, the method may comprise obtaining a second indication indicative of the two or more operating parameters associated with the set of vehicles 11.

The two or more operating parameters may be obtained, e.g., selected, for the adjustment according to actions 201. In some other examples, the two or more operating parameters may be predefined.

The second indication and the first indication may be obtained concurrently, e.g., by input into the user interface 50 indicating the two or more operating parameters and associated adjustment.

In some examples, obtaining the second indication of the two or more operating parameters comprises obtaining an indication of a first operating parameter, and based on the first operating parameter, identifying at least one secondary operating parameter. In other words, obtaining, e.g., selecting or retrieving, the first operating parameter may automatically implicitly comprise obtaining, e.g., selecting or retrieving, at least one secondary operating parameter which will also be adjusted based on the adjustment. The first operating parameter and the at least one secondary operating parameter may have a relationship, e.g., with respect to a set operation, e.g., loading, unloading, travelling, and/or maintenance; and/or with respect to a set location 5, e.g., certain operating parameters in shared areas, in maintenance areas, in parking areas, in high security areas, in loading areas, and/or in unloading areas.

In other words, the first operational parameter and the at least one secondary parameter may be associated with at least one common operation of the set of vehicles.

The common operation may be any of: unloading, loading, transporting goods or people, investigation, maintenance, congestion control, or a combination thereof, which directly is associated with the workflow of the set of vehicles 11 in the work site 100.

The at least one secondary parameter may be in the same category as the first operating parameter, or may be a sub-parameter of the first operating parameter.

The first operating parameter may be a parameter controlling a travel motion of the set of vehicles, and wherein the processing circuitry 702 is configured to identify the at least one secondary operating parameter as comprising at least one second parameter controlling a load handling parameter of the set of vehicles, or vice versa.

The second indication may be obtained as a result from an input to the user interface 50, e.g., as part of selecting the two or more operating parameters and/or the first operating parameter using the user interface 50. The input may comprise or indicate any selection of operating parameters to adjust, e.g., any one or more out of the first operating parameter, the at least one secondary operating parameter, one or more category parameters or category of parameters. The input may comprise or indicate any selection of operating parameters that shall not be subject to adjustment, e.g., any operating parameter part of the at least one secondary operating parameter, and/or any sub-parameter of the one or more category parameters or category of parameters.

As an alternative to user selection, the second indication may be obtained by obtaining sensor data and/or status information of the set of vehicles 11 and/or the work site 100, and using said sensor data and/or status information to determine the two or more operating parameters to form the second indication.

Action 203

In some examples, the method comprises obtaining a third indication indicative of respective identities of the set of vehicles 11. The identities may further be used to communicate the adjustment to the two or more operating parameters, and/or may define which one or more vehicles are to be associated with the adjustment.

If not obtained by action 203 the identities of the vehicles in the set of vehicles 11 may be predefined.

Action 204

In some examples, the method comprises obtaining a mapping, e.g., as discussed in action 201, between the at least one category parameter and/or the at least one category of parameters and the one or more sub-parameters. The mapping may be obtained as a separate input, e.g., to the user interface 50, and/or indicated by the second indication, and/or may be predefined.

Action 205

The method comprises triggering the adjustment indicated by the first indication to be applied to the two or more operating parameters.

In this way, the two or more operating parameters can flexibly be updated to adjust the workflow of the set of vehicles 11 and the work site 100 by only obtaining the adjustment to the two or more operating parameters. In other words, it is possible to efficiently adjust the workflow of the set of vehicles 11 by triggering an adjustment to multiple operating parameters, e.g., associated with a certain aspect of the workflow, e.g., a set location 5 and/or a set operation.

For example, if the certain aspect of the workflow is unloading, the two or more operating parameters may comprise any one or more out of: a tipping or dumping speed of an equipment or trailer, a set speed in a dumping area, a speed for handling an equipment of the vehicle.

For example, if the certain aspect of the workflow is loading, the two or more operating parameters may comprise any one or more out of: a set speed in a loading area, a queueing configuration with respect to a loading zone, an enumerated loading location, a maximum payload to load the set of vehicles with.

For example, if the certain aspect of the workflow is travelling and transporting goods, the two or more operating parameters may comprise any one or more out of: a distance to a second vehicle, a speed used when following a straight trajectory or path 3.

For example, if the certain aspect of the workflow is maintenance, the two or more operating parameters may comprise periodicity for calibrating sensors, location for calibrating sensors, a failure condition, e.g., estimated precision of a component or sensor, for when to send a vehicle to repair, periodicity for refueling, location for refueling, fuel or energy threshold for when to refuel or recharge.

When the first indication and second indication of actions 201 and 202 are inputs to the user interface 50, a user can easily tune the workflow by selecting the proper two or operating parameters, e.g., associated with a certain operation or category, and adjust all of these with the same adjustment, e.g., adjust by the two or more operating parameters by the same relative factor X.

In some examples, triggering the adjustment comprises transmitting to the set of vehicles 11, e.g., as indicated by the third indication of action 203, an indication of the adjustment and an indication of the two or more operating parameters. In these examples each vehicle out of the set of vehicles 11 may respectively be triggered to locally adjust the two or more operating parameters based on the adjustment for the respective vehicle. In other words, the adjustment may be triggered by each vehicle in the set of vehicles 11 locally, e.g., by the first vehicle 1. The adjusted two or more operating parameters may also be directly transmitted to the set of vehicles 11, i.e., first adjusted and then transmitted to be used by each vehicle locally. Additionally or alternatively, in some examples, triggering the adjustment comprises transmitting to a central planning unit 60, an indication of the adjustment and an indication of the two or more operating parameters. In these examples, the central planning unit 60 may be triggered to control one or more operations to be performed by the set of vehicles 11 based on the indicated adjustment and the indicated two or more operating parameters. In these examples, the planning unit 60 may transmit instructions to the set of vehicles 11, and may control and/or limit the operations of the set of vehicles 11 based on the adjustment to the two or more operating parameters.

Controlling the one or more operations to be performed by the set of vehicles 11 based on the indicated adjustment and the indicated two or more operating parameters may in some examples comprise controlling the set of vehicles 11 to any one or more out of:

- adjust speed of one or more vehicles out of the set of vehicles 11, e.g., slow down,
- reroute one or more vehicles out of the set of vehicles 11,
- add or remove vehicles in the work site 100, i.e., from the set of vehicles 11,
- update one or more mission plans for the set of vehicles 11.

In some examples, triggering the adjustment indicated by the first indication to be applied to the two or more operating parameters comprises triggering the adjustment to be applied to the one or more sub-parameters. The sub-parameters may be obtained using the mapping of action 204.

In some examples, triggering the adjustment indicated by the first indication to be applied to the two or more operating parameters comprises triggering adjustments to applicable operating parameters as indicated by the first indication or the second indication, e.g., when the first indication indicates that the adjustment is only applicable to a set type of parameters, and/or when the second indication indicates which parameters shall not be affected by the adjustment.

Figure 3:
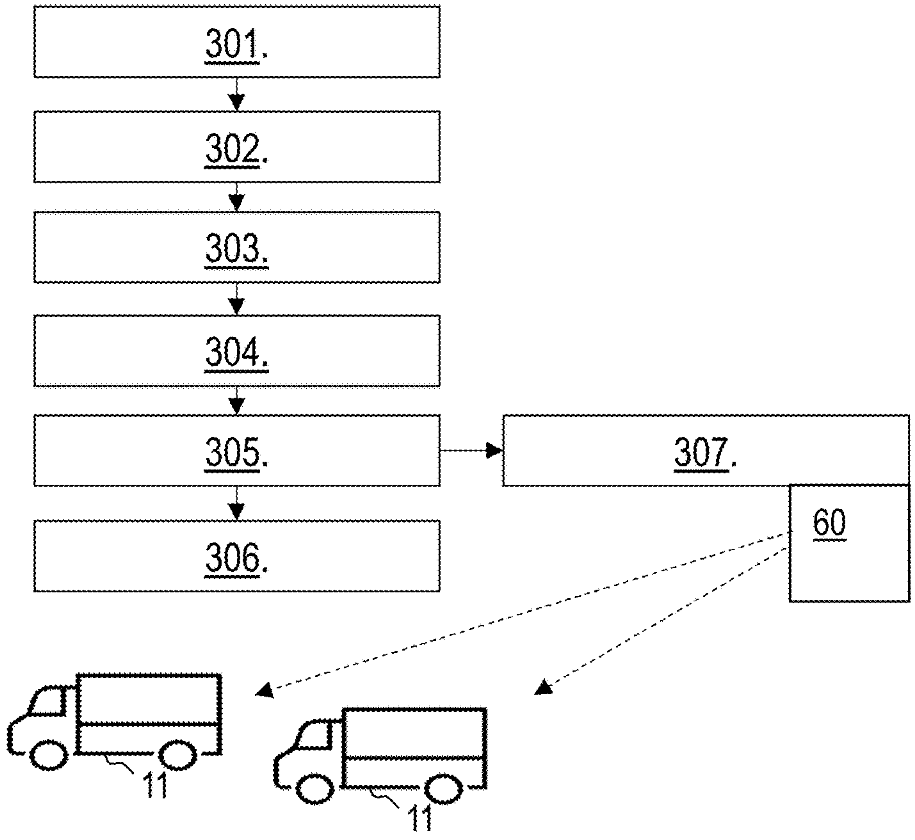
FIG. 3 is an example scenario.

FIG. 3 illustrates an example scenario applicable to any suitable example herein.

A disturbance with the work site 100 may be detected 301. The disturbance may be congestion, failures, productivity, safety hazards causing delays, longer than expected queues, etc. This may be detected by use of any method of indicating a disturbance or productivity degradation, e.g., by obtaining sensors data indicative of a malfunction in a vehicle of the set of vehicles 11 and/or sensor measurements of congestion in the work site 100.

An operator may select 302 the two or more operating parameters and input them into the user interface 50, e.g., to provide the second indication of action 202. These two or more operating parameters may also be predefined. Selecting the tow or more operating parameters may comprise selecting a first operating parameter and based on the first operating parameter, identifying at least one secondary operating parameter to for the two or more operating parameters. For example, to adjust the workflow for the work site 100, speed, e.g., as a category or as a parameter such as speed limit or set speed of the set of vehicles 11, may be selected. As at least one secondary parameter, tipping and/or dumping speed of a truck may be selected. These two or more operating parameters can then be adjusted in a uniform manner to adjust the workflow of the work site 100.

A HMI may be linked 303 to the user interface 50 to adjust the two or more operating parameters.

The operator may adjust 304 the HMI of the user interface 50, e.g., a slider, rotating knob, stalk, etc., e.g., to provide the first indication of action 201.

The first and second indication may be applied 305 to a decision tree to determine concretely which and/or how operating parameters should be adjusted. This may involve identifying related parameters based on category or based on some relationship with a selected parameter.

The adjustment may be triggered locally 306 for each vehicle, i.e., the adjustment may be performed locally per vehicle in the set of vehicles 11, or the updated two or more operating parameters are transmitted to the set of vehicles 11. The vehicles may respectively acknowledge the update or receival of parameters or adjustment.

The adjustment may be triggered centrally 307, e.g., in the central planning unit 60. The central planning unit 60 may further schedule and/or control the set of vehicles 11 based on the updated two or more operating parameters.

A combination of triggering the adjustment locally 306 and triggering the adjustment centrally 307 may also be possible, e.g., some operating parameters may be updated locally, and some may be updated in the central planning unit 60. The parameters to be updated locally or centrally may be predefined or indicated by any one or more out of the first, second, or third indication.

Figure 4:
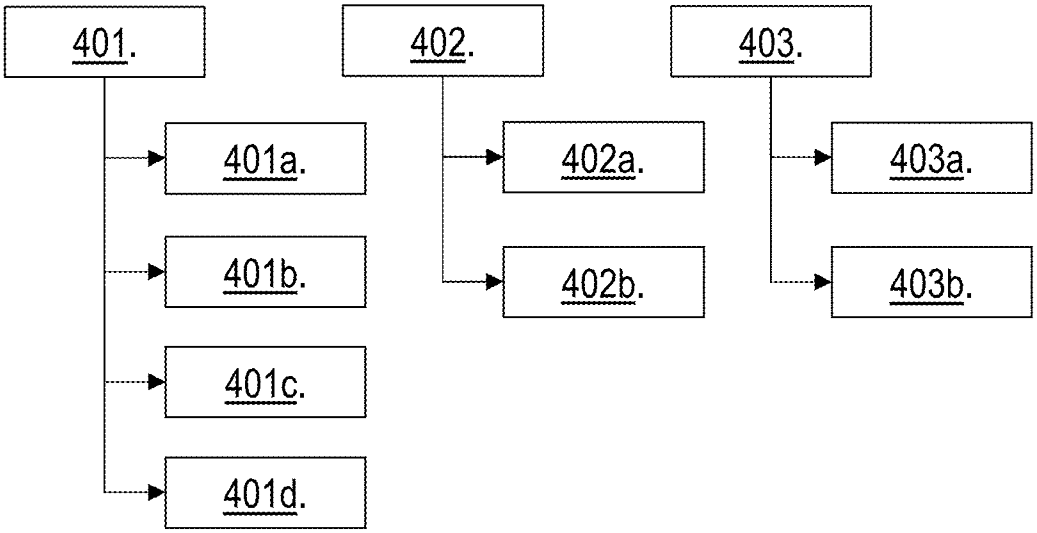
FIG. 4 is an exemplary diagram illustrating operating parameters according to an example.

FIG. 4 is an exemplary diagram illustrating operating parameters according to an example.

The two or more operating parameters may be grouped into categories or be sub-parameters of a category parameter. I.e., obtaining the second indication may comprise obtaining an indication of a category or category parameter, which implies the two or more parameters.

A first category or category parameter 401 may be vehicle speed.

The first category or category parameter 401 may be associated or linked to one or more first sub-parameters, e.g., any one or more out of vehicle acceleration 401*a*, cornering speed 401*b* i.e., a set speed or speed limit when turning, straight line speed 401*c*, i.e., a set speed or speed limit when driving on a straight trajectory or path 3, tipping speed, i.e., a speed for moving an equipment or trailer when dumping or unloading material or goods.

A second category or category parameter 402 may be a waiting time for the set of vehicles 11, e.g., how long to wait or queue under different circumstances, locations, and/or operations. The second category or category parameter 402 may be associated or linked to one or more second sub-parameters, e.g., any one or more out of: a waiting time associated with an operation 402*a*, and a waiting time associated with a location 402*b*.

A third category or category parameter 403 may be a distance to other vehicles for the set of vehicles 11. The third category or category parameter 403 may be associated or linked to one or more third sub-parameters, e.g., any one or more out of: a longitudinal following distance 403*a*, and an intersection crossing distance 403*b*.

Figure 5:
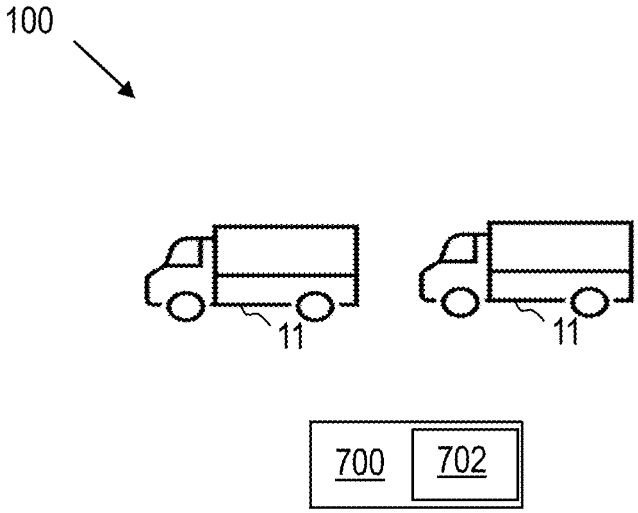
FIG. 5 is another view of FIG. 1, according to an example.

FIG. 5 is another view of FIG. 1, according to an example. The example is combinable with any one or more actions 201-205 above. The computer system 700 comprises the processing circuitry 702. The processing circuitry 702 is configured to handle two or more operating parameters associated with the set of vehicles 11 operating in the work site 100. The processing circuitry 702 is configured to obtain a first indication indicative of an adjustment to be performed to the two or more operating parameters associated with the set of vehicles 11. The processing circuitry 702 is configured to trigger the adjustment indicated by the first indication to be applied to the two or more operating parameters.

Figure 6:
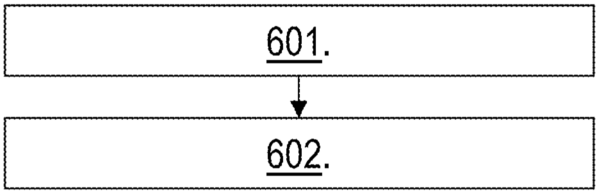
FIG. 6 is an exemplary flowchart of a method according to an example.

FIG. 6 is an exemplary flowchart of a method for handling the two or more operating parameters associated with the set of vehicles 11 operating in the work site 100, according to an example. The method comprises the following actions 601-602 which can be combined with any one or more out of actions 201-205 in any suitable manner.

Action 601

The method comprises, by the processing circuitry 702, obtaining a first indication indicative of an adjustment to be performed to the two or more operating parameters associated with the set of vehicles 11.

Action 602

The method comprises, by the processing circuitry 702, triggering the adjustment indicated by the first indication to be applied to the two or more operating parameters.

Figure 7:
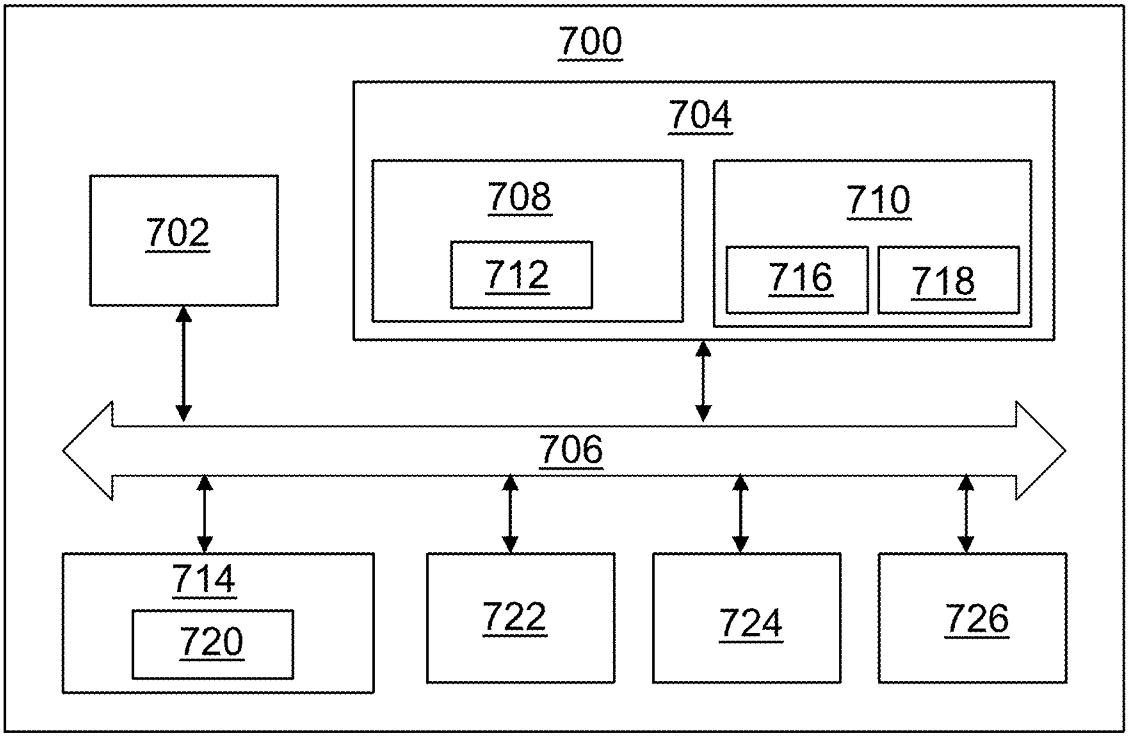
FIG. 7 is a schematic diagram of an exemplary computer system for implementing examples disclosed herein, according to an example.

FIG. 7 is a schematic diagram of the computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include the processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Examples above may be combined with the following Examples in any suitable manner.

Example 1. A computer system 700 comprising processing circuitry 702 configured to handle two or more operating parameters associated with a set of vehicles 11 operating in a work site 100, the processing circuitry 702 is further configured to:

obtain a first indication indicative of an adjustment to be performed to two or more operating parameters associated with the set of vehicles 11, and trigger the adjustment indicated by the first indication to be applied to the two or more operating parameters.

Example 2. The computer system 700 of Example 1, wherein the processing circuitry 702 is configured to:

obtain a second indication indicative of the two or more operating parameters associated with the set of vehicles 11.

Example 3. The computer system 700 of Example 2, wherein the processing circuitry 702 is configured to obtain the second indication of the two or more operating parameters by being configured to:

obtain an indication of a first operating parameter, and based on the first operating parameter, identify at least one secondary operating parameter.

Example 4. The computer system 700 of Example 3, wherein the first operational parameter and the at least one secondary parameter is associated with at least one common operation of the set of vehicles.

Example 5. The computer system 700 of Example 3 or 4, wherein the at least one secondary parameter is in a same category as the first operating parameter, or is a sub-parameter of the first operating parameter.

Example 6. The computer system 700 of any of Examples 3-5, wherein the first operating parameter is a parameter controlling a travel motion of the set of vehicles, and wherein the processing circuitry 702 is configured to identify the at least one secondary operating parameter as comprising at least one second parameter controlling a load handling parameter of the set of vehicles.

Example 7. The computer system 700 of any one of Examples 1-6, wherein the two or more operating parameters respectively controls and/or constrains one or more operations to be performed by the set of vehicles 11.

Example 8. The computer system 700 of any of Examples 1-7, wherein the processing circuitry 702 is configured to trigger the adjustment by being configured to any one or both out of, transmit to the set of vehicles 11, an indication of the adjustment and an indication of the two or more operating parameters, wherein each vehicle out of the set of vehicles 11 are respectively triggered to locally adjust the two or more operating parameters based on the adjustment for the respective vehicle, transmit to a central planning unit 60, an indication of the adjustment and an indication of the two or more operating parameters, wherein the central planning unit 60 is triggered to control one or more operations to be performed by the set of vehicles 11 based on the indicated adjustment and the indicated two or more operating parameters.

Example 9. The computer system 700 of any of Examples 1-8, wherein the set of vehicles 11 comprises all vehicles operating in the work site 100, or a sub-set of vehicles 11 operating in the work site 100.

Example 10. The computer system 700 of any of Examples 1-9, wherein the processing circuitry 702 is further configured to obtain a third indication indicative of respective identities of the set of vehicles 11.

Example 11. The computer system 700 of any of Examples 1-10, wherein the processing circuitry 702 is configured to obtain the first indication as input from a user interface 50.

Example 12. The computer system 700 of any of Examples 1-11, wherein the two or more operating parameters comprise any one or more out of:

one, two, or more transport related parameters, a work related parameter, a maintenance related activity, an acceleration of the set of vehicles 11, a turning speed of the set of vehicles 11, a speed when driving in straight section of the set of vehicles 11, a movement speed of equipment of the set of vehicles 11, a tipping speed of equipment of the set of vehicles 11, a maximum and/or minimum load of the set of vehicles 11, one or more brake configurations of the set of vehicles 11, one or more parameters of a speed profile of the set of vehicles 11, one or more speed profiles of the set of vehicles 11, one or more queuing configurations of the set of vehicles 11, one or more waiting times for one or more vehicle conditions of the set of vehicles 11, one or more waiting times for one or more locations 5 of the set of vehicles 11, a longitudinal following distance 7 of the set of vehicles 11, one or more situational crossing distances of the set of vehicles 11, preferably comprising an intersection crossing distance, and one or more enumerated locations.

Example 13. The computer system 700 of any of Examples 1-12, wherein the two or more operating parameters comprise or is represented by at least one category parameter and/or at least one category of parameters, which at least one category parameter and/or at least one category of parameters is mapped to respective one or more sub-parameters based on a mapping, and wherein the processing circuitry 702 is further configured to trigger the adjustment indicated by the first indication to be applied to the two or more operating parameters by being configured to trigger the adjustment to be applied to the respective one or more sub-parameters.

Example 14. The computer system 700 of Example 13, wherein the at least one category parameter and/or at least one category of parameters comprises any one or more out of:

speed of the set of vehicles 11, waiting time of the set of vehicles 11, distance to other vehicles for the set of vehicles 11, location of one or more operations to be performed by the set of vehicles 11; and wherein the corresponding one or more sub-parameters of the at least one category parameter comprises any one or more out of:

for speed of the set of vehicles 11, any one or more out of: an acceleration, a turning speed, a speed when driving in straight section, a movement speed of equipment of the set of vehicle, a maximum and/or minimum loading weight of the set of vehicles 11, a speed profile of the set of vehicles 11, a brake configuration of the set of vehicles 11, and a tipping speed of equipment of the set of vehicles 11;

for waiting time of the set of vehicles 11, any one or more out of: one or more waiting times for one or more vehicle conditions, a queuing configuration, and one or more waiting times for one or more locations 5, for distance to other vehicles, any one or more out of: a default longitudinal following distance 7, a queuing configuration, and one or more situational crossing distances, preferably comprising an intersection crossing distance, for location of operations to be performed by the set of vehicles 11, one or more enumerated locations.

Example 15. The computer system 700 of any of Examples 1-14, wherein the adjustment is represented as a relative adjustment to the two or more operating parameters.

Example 16. A first vehicle 1 comprising the computer system 700 of any of Examples 1-15.

Example 17. The first vehicle 1 of Example 16, wherein the first vehicle is at least partly autonomous, and wherein the first vehicle 1 is part of a set of vehicles 11, where each vehicle in the set of vehicles 11 is controlled and/or constrained by the two or more operating parameters according to any of Examples 1-15.

Example 18. A computer-implemented method for handling two or more operating parameters associated with a set of vehicles 11 operating in a work site 100, comprising:

by processing circuitry 702 of a computer system 700, obtaining 201, 601 first indication indicative of an adjustment to be performed to two or more operating parameters associated with the set of vehicles 11, by the processing circuitry 702, triggering 205, 602 the adjustment indicated by the first indication to be applied to the two or more operating parameters.

Example 19. The computer-implemented method of Example 18, further comprising:

by the processing circuitry 702, obtaining 202 a second indication indicative of the two or more operating parameters associated with the set of vehicles 11, and optionally, wherein obtaining 202 the second indication of the two or more operating parameters comprises:

obtaining an indication of a first operating parameter, and based on the first operating parameter, identifying at least one secondary operating parameter.

Example 20. The computer-implemented method of Example 18 or 19, further comprising:

by the processing circuitry 702, obtaining 203 a third indication indicative of the set of vehicles 11.

Example 21. A computer program product comprising program code for performing, when executed by the processing circuitry 702, the method of any of Examples 18-20.

Example 22. A non-transitory computer-readable storage medium comprising instructions, which when executed by the processing circuitry 702, cause the processing circuitry 702 to perform the method of any of Examples 18-20.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to handle two or more operating parameters associated with a set of vehicles operating in a work site, the processing circuitry is further configured to:

obtain a first indication indicative of an adjustment to be performed to two or more operating parameters associated with the set of vehicles, obtain a second indication indicative of the two or more operating parameters associated with the set of vehicles, wherein obtaining the second indication of the two or more operating parameters comprises:

obtaining an indication of a first operating parameter; and based on the first operating parameter, identifying at least one secondary operating parameter, trigger the adjustment indicated by the first indication by performing any one or both of:

transmitting to the set of vehicles an indication of the adjustment and an indication of the two or more operating parameters, wherein each vehicle of the set of vehicles is triggered to locally adjust the two or more operating parameters based on the adjustment for the respective vehicle; and transmitting to a central planning unit an indication of the adjustment and an indication of the two or more operating parameters, wherein the central planning unit is triggered to control one or more operations to be performed by the set of vehicles based on the indicated adjustment and the indicated two or more operating parameters, wherein the two or more operating parameters respectively control and/or constrain one or more operations to be performed by the set of vehicles, wherein the first operating parameter is a parameter controlling a travel motion of the set of vehicles, and wherein the processing circuitry is configured to identify the at least one secondary operating parameter as comprising at least one second parameter controlling a load handling parameter of the set of vehicles, wherein the set of vehicles comprises a plurality of vehicles, wherein the set of vehicles comprises all vehicles operating in the work site, or a sub-set of all vehicles operating in the work site, and wherein transmitting the indication of the adjustment and the indication of the two or more operating parameters causes the two or more operating parameters to be adjusted to control an entire workflow at the work site.

2. The computer system of claim 1, wherein the processing circuitry is configured to:

obtain a second indication indicative of the two or more operating parameters associated with the set of vehicles.

3. The computer system of claim 2, wherein the processing circuitry is configured to obtain the second indication of the two or more operating parameters by being configured to:

obtain an indication of a first operating parameter, and based on the first operating parameter, identify at least one secondary operating parameter.

4. The computer system of claim 3, wherein the first operational parameter and the at least one secondary parameter is associated with at least one common operation of the set of vehicles.

5. The computer system of claim 3, wherein the at least one secondary parameter is in a same category as the first operating parameter, or is a sub-parameter of the first operating parameter.

6. The computer system of claim 3, wherein the first operating parameter is a parameter controlling a travel motion of the set of vehicles, and wherein the processing circuitry is configured to identify the at least one secondary operating parameter as comprising at least one second parameter controlling a load handling parameter of the set of vehicles.

7. The computer system of claim 1, wherein the processing circuitry is configured to trigger the adjustment by being configured to any one or both out of, transmit to the set of vehicles, an indication of the adjustment and an indication of the two or more operating parameters, wherein each vehicle out of the set of vehicles are respectively triggered to locally adjust the two or more operating parameters based on the adjustment for the respective vehicle, transmit to a central planning unit, an indication of the adjustment and an indication of the two or more operating parameters, wherein the central planning unit is triggered to control one or more operations to be performed by the set of vehicles based on the indicated adjustment and the indicated two or more operating parameters.

8. The computer system of claim 1, wherein the processing circuitry is configured to obtain the first indication as input from a user interface.

9. The computer system of claim 1, wherein the adjustment is represented as a relative adjustment to the two or more operating parameters.

10. A first vehicle, comprising:

a computer system including processing circuitry configured to handle two or more operating parameters associated with a set of vehicles operating in a work site, the processing circuitry is further configured to:

obtain a first indication indicative of an adjustment to be performed to two or more operating parameters associated with the set of vehicles, obtain a second indication indicative of the two or more operating parameters associated with the set of vehicles, wherein obtaining the second indication of the two or more operating parameters comprises:

obtaining an indication of a first operating parameter; and based on the first operating parameter, identifying at least one secondary operating parameter, trigger the adjustment indicated by the first indication by performing any one or both of:

transmitting to the set of vehicles an indication of the adjustment and an indication of the two or more operating parameters, wherein each vehicle of the set of vehicles is triggered to locally adjust the two or more operating parameters based on the adjustment for the respective vehicle; and transmitting to a central planning unit an indication of the adjustment and an indication of the two or more operating parameters, wherein the central planning unit is triggered to control one or more operations to be performed by the set of vehicles based on the indicated adjustment and the indicated two or more operating parameters, wherein the two or more operating parameters respectively control and/or constrain one or more operations to be performed by the set of vehicles, wherein the first vehicle is at least partly autonomous, wherein the set of vehicles comprises a plurality of vehicles, wherein the set of vehicles comprises all vehicles operating in the work site, or a sub-set of all vehicles operating in the work site, and wherein triggering the adjustment causes the two or more operating parameters to be adjusted to control an entire workflow at the work site.

11. A computer-implemented method for handling two or more operating parameters associated with a set of vehicles operating in a work site, comprising:

by processing circuitry of a computer system, obtaining first indication indicative of an adjustment to be performed to two or more operating parameters associated with the set of vehicles, by the processing circuitry, obtaining a second indication indicative of the two or more operating parameters associated with the set of vehicles, wherein obtaining the second indication of the two or more operating parameters comprises:

obtaining an indication of a first operating parameter; and based on the first operating parameter, identifying at least one secondary operating parameter, by the processing circuitry, triggering the adjustment indicated by the first indication by performing any one or both of:

transmitting to the set of vehicles an indication of the adjustment and an indication of the two or more operating parameters, wherein each vehicle of the set of vehicles is triggered to locally adjust the two or more operating parameters based on the adjustment for the respective vehicle; and transmitting to a central planning unit an indication of the adjustment and an indication of the two or more operating parameters, wherein the central planning unit is triggered to control one or more operations to be performed by the set of vehicles based on the indicated adjustment and the indicated two or more operating parameters, wherein the two or more operating parameters respectively control and/or constrain one or more operations to be performed by the set of vehicles;

and optionally, wherein the method further comprises any one or more out of:

by the processing circuitry, obtaining a third indication indicative of the set of vehicles, wherein the first operating parameter is a parameter controlling a travel motion of the set of vehicles, and wherein the processing circuitry is configured to identify the at least one secondary operating parameter as comprising at least one second parameter controlling a load handling parameter of the set of vehicles, wherein the set of vehicles comprises a plurality of vehicles, wherein the set of vehicles comprises all vehicles operating in the work site, or a sub-set of all vehicles operating in the work site, and wherein triggering the adjustment causes the two or more operating parameters to be adjusted to control an entire workflow at the work site.

12. A non-transitory computer-readable storage medium comprising instructions, which when executed by the processing circuitry, cause the processing circuitry to perform the method of claim 11.

* * * * *